US008864881B2

(12) United States Patent
Suppiah et al.

(10) Patent No.: US 8,864,881 B2
(45) Date of Patent: Oct. 21, 2014

(54) SLUG SUPPRESSOR APPARATUS AND CRUDE OIL STABILIZATION ASSEMBLY AND PROCESS THEREFOR

(75) Inventors: Aruljothy Suppiah, Kuala Lumpur (MY); Boon Lee Ooi, Kuala Lumpur (MY)

(73) Assignee: NGLTech SDN. BHD., Kuala Lumpur (MY)

( * ) Notice: Subject to any disclaimer, the term of this patent is extended or adjusted under 35 U.S.C. 154(b) by 309 days.

(21) Appl. No.: 13/393,732

(22) PCT Filed: Sep. 1, 2010

(86) PCT No.: PCT/MY2010/000156
§ 371 (c)(1),
(2), (4) Date: Mar. 1, 2012

(87) PCT Pub. No.: WO2011/028093
PCT Pub. Date: Mar. 10, 2011

(65) Prior Publication Data
US 2012/0160103 A1    Jun. 28, 2012

(30) Foreign Application Priority Data

Sep. 1, 2009 (MY) ............................. PI 20093603
Aug. 30, 2010 (MY) .......................... PI 2010004087

(51) Int. Cl.
*B01D 19/00* (2006.01)
(52) U.S. Cl.
CPC ................................. *B01D 19/0036* (2013.01)
USPC .................... 95/249; 96/194; 96/201; 96/157
(58) Field of Classification Search
CPC ......................... B01D 19/0036; B01D 19/0063
USPC ............. 95/249, 248, 250, 247; 96/194, 201, 96/193, 157
See application file for complete search history.

(56) References Cited

U.S. PATENT DOCUMENTS

| | | | |
|---|---|---|---|
| 2,781,293 A | 2/1957 | Ragatz | |
| 3,704,567 A * | 12/1972 | Engel | 95/19 |
| 4,824,445 A | 4/1989 | Minkkinen | |
| 5,288,312 A | 2/1994 | Payne et al. | |
| 5,645,692 A | 7/1997 | Gourlia et al. | |
| 6,390,114 B1 | 5/2002 | Haandrikman et al. | |
| 2003/0010204 A1 * | 1/2003 | Molyneux et al. | 95/22 |
| 2008/0264645 A1 | 10/2008 | Shen et al. | |
| 2009/0133578 A1 * | 5/2009 | Bras et al. | 95/259 |
| 2010/0212492 A1 * | 8/2010 | Miotto et al. | 95/22 |
| 2011/0072975 A1 * | 3/2011 | Aarebrot et al. | 96/157 |

OTHER PUBLICATIONS

Design and Performance of Slug Damper, Journal of Energy Resources Technology, Dec. 2008, vol. 130, pp. 1-12, Reinoso et al.

* cited by examiner

*Primary Examiner* — Duane Smith
*Assistant Examiner* — Douglas Theisen
(74) *Attorney, Agent, or Firm* — Gable Gotwals

(57) ABSTRACT

A slug suppressor apparatus comprising an inlet separator capable of gas-liquid separation of full well stream fluid and expanded inclined liquid pipe for dampening slugs. The inlet separator has an inlet for receiving the full well stream fluid, a separated gas outlet in its upper section, and a separated liquid outlet in its lower section. The separated gas outlet and the separated outlet are operationally connected to a gas bypass line and the expanded inclined liquid pipe respectively. The expanded inclined liquid pipe has means for dampening liquid slugs and is connectable to a 3-Phase separator.

22 Claims, 10 Drawing Sheets

SLUG SUPPRESSOR APPARATUS AND CRUDE OIL STABILIZATION ASSEMBLY AND PROCESS THEREFOR

CROSS-REFERENCE TO RELATED APPLICATIONS

This application is the United States National Phase of PCT Patent Application No. PCT/MY2010/000156 filed 1 Sep. 2010, which claims priority to Malaysian Patent Application No. PI 20093603 filed 1 Sep. 2009 and to Malaysian Patent Application No. PI 2010004087 filed 30 Aug. 2010, which are incorporated herein by reference.

BACKGROUND OF THE INVENTION

The present invention relates to a system for separation and stabilisation of crude oil and more particularly to apparatus that is applicable to all oil and gas producing and processing facilities where gas, oil and water separation and/or oil stabilization is required.

BACKGROUND ART

The most common conventional means of separating oil, gas and water and stabilizing the oil is by means of a multistage separation train, operated at progressively reduced pressures and the application of heat at the inlet to the first stage separator to enhance emulsion breaking and possibly at the interstage to assist in the stabilization of the oil.

Separators are pressure vessels with internal components that are designed to separate oil and hydrocarbon gases from the crude oil. FIG. 1 shows a conventional three-stage crude oil separator. As its name implies the separation takes place in three stages operated at progressively reduced pressures.

In this system, unprocessed crude 20 from production flowlines is directed to a first stage separator 22 and then to a second stage separator 24 and then to a third stage separator 26, all at progressively reduced pressures. At each stage the gas phase 28 is separated from the liquid phase 30. The resultant processed crude oil is then routed to a dry tank 32 and then transported 34 to the transit pumps.

The separation of the gas, known as associated gas, and water from the crude oil is effected simply by gravity by virtue of the difference in densities of the streams. Crude oil enters the separators at a high pressure and flow rate. The separators function to reduce the pressure and flow rate of the stream and flash out the gas. The internal mechanical devices provided in the separators such as baffles, demisters, foam or wave breakers, water weir, draw-off boot, etc., facilitate the separation of the gas and water from the crude oil.

This conventional means of separating oil, gas and water and stabilizing the oil however is very energy intensive mainly due to inlet gas, oil and water heating requirements that result in high energy consumption. Also, a multistage separation system, typically with 2 or 3 separation stages, results in low recovery of valuable stabilized liquids as such a separation system in inherently relatively inefficient in terms of stabilized liquid product recovery.

It must also be added that such conventional separation systems are bulky and not particularly economical.

For enhanced recovery, a stabilization column is typically used in-lieu of a multi-stage separation train as detailed above. FIG. 2 shows the typical flow path and mass transfer of a stabilization column. Liquid flows downward from top to bottom while gas flows upwards from bottom to top of the column. The liquid and gas are contacted in multiple stages resulting in preferential transfer of light components to the gas phase and heavier components to the liquid phase. This results in improved stabilized liquid recovery when compared to a multistage separation scheme as detailed above. However, conventional stabilizer columns are tall and are typically not utilized offshore particularly on floating facilities as the motion effects are significantly amplified with tall columns thus impacting their performance.

FIG. 3 gives a typical configuration of a stabilization column system. Here, an inlet liquid distributor device is provided at the top of the column. The liquid distributor ensures proper liquid distribution in the column. The liquid distributor has a down-corner with the top connected to the gas phase. This ensures that liquid flow rate through the liquid distributor is dependent on the liquid static head in the down-corner. Thus, the taller the liquid down-corner is, the higher the turndown of the column. To avoid a very tall down-corner and thus a very tall column, the turndown of the column is typically limited to approximately 50% of the design rate. This is a problem particularly for offshore facilities where turndown of as low as 10% of design rate is required.

An additional drawback of the system is that the design liquid flow rates are generally high, resulting in a large column liquid boot section. Typically, the residence time for liquid at the bottom of the column is approximately 3 minutes, both to meet degassing requirements and to provide surge volume. This also causes the column height to be further increased.

Another feature of a conventional column configuration is that liquid from the column is sent directly to the reboiler. This results in excessive heat duty being required at the reboiler. High heat duty requirements can significantly increase the complexity of the heating medium supply system apart from reducing the energy efficiency of the facility.

Another concern with stabilization columns is that, compared to separators used in multistage separation trains, the availability of the columns is lower. This is evident as the column has significant more internals including trays or packing, gas and liquid distributor, etc. The columns will generally require more downtime for maintenance and are more prone to failure compared to separators. This again is a concern particularly for offshore production facilities where high availability is generally required.

Due to the above issues, i.e. tall height of column, high heating duty requirements and comparatively low availability of columns, stabilization columns are generally avoided, particularly for offshore production facilities. This is despite the fact that stabilization columns result in higher recovery of stabilized crude compared to multistage separation trains.

There is thus a need for a stabilization column configuration that mitigates these issues and thus enables enhanced recovery of stabilized crude.

Another problem besetting conventional crude oil separating systems is that of slugging. Crude oil production receiving facilities particularly those receiving production from multi-phase subsea pipelines are susceptible to slugs arriving from multiphase pipelines and risers. This is particularly the case for production receiving facilities receiving crude and associated gas from remote wells via pipelines and risers. Slugs generated in the pipelines and risers not only require processing facilities to be increased in size to accommodate the slugs, but also results in production upsets associated with the high speed at which the slugs arrive and the transient pressure fluctuations due to the surge of gas following the arrival of the slugs. Under these scenarios the production facilities like inlet heat exchangers, production separators and downstream gas compressors generally will not be able to cope with this transient slugging phenomenon resulting in production upsets and possibly shutdown.

To address this problem, ChevronTexaco Production and Exploration Technology Co. developed a slug damper to reduce the magnitude of short period flow fluctuations by providing an inexpensive way of increasing liquid retaining capacity of the inlet piping tailored for use with a downstream compact cyclonic separation device such as a Gas Liquid Cylindrical Cyclone (GLCC). The slug damper, shown schematically in FIG. 4, can protect the downstream metering equipment and also extend the operational envelop of the GLCC.

Referring to FIG. 4, the ChevronTexaco slug damper begins with a multiphase pipeline inlet 1, for receiving a gas-liquid mixture slug, that expand to a slightly inclined section 2 that has a larger diameter than the pipeline inlet 1. This inclined section 2 branches at a splitting T-j unction into two large diameter legs that are likewise larger in diameter than the pipeline inlet 1. The two legs consist of a gas bypass 3 and an inclined expanded pipe or liquid reservoir 4. The gas bypass 3 has a substantially horizontal section that is inclined upward at 1.8° and the liquid reservoir 4 is inclined downward at 1.4°. The inclined liquid reservoir 4 reduces the magnitude of short period flow fluctuations by providing for coarse separation of gas from liquid and for increasing the liquid retaining capacity of the inlet piping to the downstream separation device. The liquid reservoir 4 has a segmented orifice 5 just upstream of the GLCC body 9. The inclined liquid reservoir 4 splits in its terminal end into a lower GLCC inclined inlet 6 for liquid outflow from the liquid reservoir 4 into the GLCC body 9 and a second, gas bypass 7 that connects to the upper GLCC inclined inlet 8 which comprises the terminal end of the gas bypass 3 and which connects with the upper portion of the GLCC body 9. A liquid outlet from GLCC 10 is located at the lower portion of the GLCC body 9 and a gas outlet from GLCC 11 is located at the upper portion thereof.

As can be seen in the illustration, the segmented orifice 5 is open at the bottom and closed at the top. During normal operation without large slugs, the production goes through the orifice 5 without any interruption or pressure drop. However, when large slugs arrive, the increase in liquid velocity causes the segmented orifice 5 to dampen the flow into the GLCC body 9, forcing the liquid to accumulate in the liquid reservoir 4 of the slug damper. This results in a fairly constant flow rate through the orifice 5 and into the GLCC body 9. The gas phase is bypassed through the gas bypass 3 into the upper part of the GLCC body 9.

While serving its purpose of dampening slugs well, this ChevronTexaco slug damper suffers from a drawback in that as the liquid reservoir 4 has a constant inclination, it will have only limited slug handling capacity. This is because with the liquid reservoir 4 full of liquid, the flow through the segmented orifice 5 will correspond to the design flow. Thus at design flow, the liquid reservoir 4 will generally be full of liquid and will not have further slug handling capacity, resulting in unfavorable backup of liquid into the gas bypass 3 line. Even if the length of the liquid reservoir 4 is increased to handle additional slugs, it will correspondingly increase the liquid flow rate through the segmented orifice 5 due to the increased static head and thus exceed the processing capacity of the downstream system or require that the downstream system be increased in design capacity. In addition, this ChevronTexaco slug damper does not provide any means for managing the slugs in the liquid reservoir 4 as the speed with which the liquids flow through the orifice depends solely on the available liquid static head. Another concern is that the configuration of the liquid reservoir 4 and gas bypass 3 line renders the gas liquid separation being very coarse and is likely that much of the liquid will be unfavorably routed into the gas bypass 3 line. Whilst this ChevronTexaco slug damper is suitable for the specific application with a compact cyclonic separator (GLCC), it is not suitable for general applications where slug handling and stable flow to the downstream system are required.

Conventional slug catchers, if adequately sized, will be able to accommodate the slugs and control liquid flow to the downstream system, but this will result in large vessel sizes with control valves at both the gas and liquid outlet lines and possibly at the inlet. These, in many cases, are expensive with low reliability (due to the controls at the outlet lines and possibly at the inlet line) and are generally too large for installation on offshore facilities. An additional problem with these conventional slug catchers is that they do not suppress the typically large gas surge that follows a liquid slug. Slugging results in the compression of the gas phase behind a slug. The transportation of a slug requires a larger pressure behind the slug to keep the plug moving through the pipeline. This pressure increase depends on the size of the liquid slug. After the slug arrives at the outlet of the pipeline or production platform, the compressed gas creates a large gas surge, which again may result in major upsets in topside facilities, like the downstream gas compression trains.

Thus, there is a need for a slug suppression device that will accommodate slugs without causing flow fluctuations at the downstream processing facilities and also avoids the need to oversize the downstream system.

With respect to the separation of the Full Well Fluid, typically an inlet heat exchanger or inlet heater is provided to heat the fluid prior to it being routed to the 3-Phase Separator irrespective of whether a slug damper is employed. This is to ensure that the temperature of the liquid is high enough to break emulsions, and if the crude is waxy to mitigate against wax formation. However, without effective separation upstream, heating duties will be high as both the gas stream and liquid streams are heated and this will also increase cooling duty requirements as the gas will need to be cooled prior to compression. In addition, without effective slug suppression upstream, the performance of the heat exchanger will not be good due to slug flow conditions at the exchanger.

In addition, the presence of sand in the production fluid often results in sand build-up in the downstream separator which in turn possibly requires frequent shutdowns to remove sand from the separator or requires sand removal devices to be installed at the separator which are expensive.

Thus, there is a need for a cost effective slug suppression device coupled with an efficient gas-liquid separation device which obviates the problem of build-up in the downstream separator and which has minimal controls for enhanced reliability.

There is therefore, generally, an urgent need in the art and industry for a system for oil and gas separation and stabilization of the resulting oil that addresses the following issues over the conventional systems:
   Slug management
   Sand management
   Wax management in the event of waxy crude
   Motion effect in the case of a Floating Production Storage and Offloading (FPSO) based system
Such a system should also have the following advantages:
   A configuration that is compact and economical
   Reduced cooling and heating duty of downstream system
   Reduced pressure drop and reduced gas compression requirements A larger slug handling capacity for a given footprint
An integrated sand handling facility
Minimal number of instrumentations are required

DISCLOSURE OF INVENTION

It is an objective of the present invention to provide a slug suppression system that is effective in its functionality, with minimal controls to improve reliability and can be implemented in a majority of offshore facilities in a cost effective manner. It is also the intention of this invention to enable efficient crude oil separation at the downstream facilities and also allows for downsizing of bulky components associated with conventional oil separation systems. Efficient utilization of energy is another focus of this invention.

It is another objective of the present invention to provide an assembly for crude oil stabilization that is energy efficient, compact and economical whilst improving its availability.

The first objective is met by the Slug Suppressor apparatus of the present invention which consists of an Inlet Separator, for gas and liquid separation of Full Well Stream (FWS) fluid, that has a Gas Bypass Line at its upper section and an Expanded Inclined Liquid Pipe at its lower end. The liquid component, including liquid slugs, of FSW fluid entering the Inlet Separator is diverted to the Expanded Inclined Liquid Pipe and the gas component thereof is routed to the Gas Bypass Line.

The Inlet Separator component of the present invention allows, as a minimum, coarse gas-liquid separation. The Inlet Separator need not be provided with a liquid hold-up and degassing section, as part of the vessel construction. The Expanded Inclined Liquid Pipe instead serves the function of liquid hold-up and degassing. This configuration also minimizes controls and fittings in the system as level control valves are not provided at the liquid outlet line.

The Expanded Inclined Liquid Pipe of the Slug Suppressor has a first Liquid Reservoir Pipe of low overall inclination and ample slug volume, a second pipe section that has a substantially higher overall inclination, termed Head Pipe, predetermined to provide sufficient liquid head to overcome pressure drop of the downstream system whilst providing some surge volume, and a third Restrictor Pipe, with at least one segmented orifice within, that connects to a conventional 3-Phase Separator. The segmented orifice of this Restrictor Pipe is dimensioned to restrict maximum liquid flow at maximum upstream static head to no more than the maximum liquid handling capacity of the apparatus downstream of the Slug Suppressor apparatus.

The segmented orifice, where the orifice opening is at the bottom section, allows fluid to flow through the opening, allowing sand and debris to pass, thus avoiding any accumulation and blockage of solids at the orifice. If sand is expected in the incoming FWS fluid, a Sand Separator may be included upstream or downstream of the segmented orifice. Alternatively, the segmented orifice may be replaced by a heat exchanger or a sand removal device or any combination of these depending on system requirements such that the available static head in the Head Pipe will be able to overcome the frictional loss associated with flow of fluid through these items.

The system hydraulics is set such that at normal steady state design flow conditions, normal liquid level in the Expanded Inclined Liquid Pipe will not exceed the height of the Head Pipe.

The Gas Bypass Line is operationally connected to the Restrictor Pipe downstream of the segmented orifice, so that the gas and liquid streams co-mingle to ensure that the pressure of the gas and liquid streams are equalized. The Gas Bypass Line is dimensioned for full gas flow rate with minimal pressure drop.

A control valve which is normally kept in the open position may be provided at the Gas Bypass Line and is responsive to a high liquid level control signal to evacuate liquids from the Liquid Reservoir Pipe so that the Liquid Reservoir Pipe is emptied as quickly as possible to receive the subsequent slug. A high liquid level override signal to open the control valve may be provided from the 3-Phase Separator to ensure that liquid level in the 3-Phase Separator does not exceed a preset level.

The Gas Bypass Line is located preferably above the maximum expected liquid level of the Inlet Separator to ensure that no liquids from the Inlet Separator enter the Gas Bypass Line. Balance Lines are provided between the Gas Bypass Line and Liquid Reservoir Pipe to dislodge any trapped vapor at the Liquid Reservoir Pipe. The Balance Lines are nominally approximately 2" (5.1 cm) to 4" (10.2 cm) pipes located about one for every 20 meters of pipe run.

Alternatively, if the Gas Bypass Line cannot be located above the maximum expected liquid level of the Inlet Separator, the Balance Lines will be tied-in to a separate header to be connected to a high point at the inlet separator, above the maximum expected liquid level.

As most of the turbulences associated with receipt of 3 phase fluids are suppressed at the upstream Inlet Separator and the Liquid Reservoir Pipe the separation efficiency of the 3-Phase Separator is significantly enhanced making for a compact and cost effective system for crude oil separation. Apart from suppressing the arrival of liquid slugs into the downstream processing system, the slug separation system also suppresses the gas surge and associated pressure surges that typically accompany liquid slugs. This results in less complex controls being required at the downstream system and reduces the likelihood of upsets in the process facilities, including the gas compression trains that are susceptible to gas and pressure surges. Also, as one of the most bulky components of a conventional oil separation system is the 3-Phase Separator, the size of the 3-Phase Separator of the present invention is significantly reduced since bulk gas separation may be effected at the upstream Inlet Separator and slugs are dealt with at the upstream Liquid Reservoir Pipe.

The another objective of the present invention to provide an apparatus for crude oil stabilization that is efficient, compact and economical, is realized by the provision of a crude oil stabilization assembly that consists of a stabilizer column, a separator or an expanded standpipe for vapor-liquid disengagement provided, upstream of the stabilizer column, an expanded down-corner pipe at the base of the stabilizer column, a crude exchanger in operational connection with the down-corner pipe, a riser pipe and a Surge/Reboiler Vessel in operational connection with the crude exchanger via the riser pipe.

In operation, crude from the electrostatic coalescer (desalter) is cooled (depending on specific system requirements) prior to being routed to the top of the column. Depending on the solids content of the crude to the column and the type of packing used in the column, a filter for solids removal may be required upstream of the column.

Un-stabilized crude which may have some flash gas is first sent to a separator or standpipe. Liquid from the separator or stand pipe is routed to the liquid distributor of the stabilizer column. The gas from the separator or standpipe is routed via a gas outlet line thereof to the gas outlet line of the stabilizer column. This ensures that liquid flow through the liquid distributor in the column is a function of the static head of liquid in the separator or standpipe and the friction loss at the liquid distributor. This eliminates the requirement for the down-corner pipe that is typically provided within the column and thus reduce the column height. In addition, with the liquid static head for the liquid distributor maintained outside of the column, high turndowns of the liquid distributor and column is facilitated by providing adequate liquid column height in the separator or standpipe with corresponding adjustment of pressure drop at the liquid distributor nozzles. This enables high turndown of the column to be achieved without the need to increase the height of the column.

Liquids after contacting with vapor from the Surge/Reboiler Vessel collect in the down-corner pipe at the base of the stabilizer column. The column is not provided with a liquid hold-up boot. The liquid from the stabilizer column bottom is routed via the expanded down-corner pipe at the base of the column to a crude exchanger which functions as a thermosyphon exchanger. Liquid with flashed vapor from the crude exchanger is routed to the Surge/Reboiler Vessel via a riser pipe for further heating of the crude to the desired temperature to stabilize the crude and for vapor-liquid separation. Gas from the Surge/Reboiler Vessel is routed to the base of the stabilizer column while stabilized liquid from the vessel is routed to the crude exchanger for heat recovery. The stabilizer column base is located at an elevation higher than the maximum liquid level in the Surge/Reboiler Vessel.

As the liquid surge requirements are housed within the Surge/Reboiler Vessel, the column need not be provided with a liquid boot for managing the liquid surges in the system. Instead an expanded down-corner pipe sized for degassing requirements with a nominal surge capacity is adequate. This further reduces the height of the Stabilizer column.

Another feature of the assembly is that liquid from the column is sent to a thermosyphon type crude exchanger before being routed to the Surge/Reboiler Vessel for heat recovery from the hot stabilized crude from the Surge/Reboiler Vessel. This significantly reduces the net heat duty required at the reboiler and thus reduces the complexity of the heating medium supply system apart from increasing the energy efficiency of the facility: To avoid un-stable operation during turndown flow conditions (that is prevalent with systems configured with thermosyphon exchangers), a crossover line from the riser pipe to the bottom of the Surge/Reboiler Vessel is provided to ensure that at turndown flow rates, high liquid levels do not build-up in the riser pipe.

Balance Lines are provided between the standpipe and the stabilizer column to dislodge any trapped vapor at the down-corner pipe.

According to an additional preferred embodiment, the Slug Suppressor apparatus of the present invention consists of an Inlet Separator, for gas-liquid separation of production fluid such as Full Well Stream (FWS) fluid, which is connected at its bottom section to a diagonally disposed Expanded Inclined Liquid Pipe and at its upper section to a Gas Bypass Line. The Expanded Inclined Liquid Pipe is a large size pipe that is sized to accommodate the largest anticipated liquid slug or liquid surge volume from its normal liquid level. The inclination of the Expanded Inclined Liquid Pipe is such that it has sufficient liquid column to overcome the downstream pressure drop. The separated liquid from the Inlet Separator is routed to the Expanded Inclined Liquid Pipe while the separated gas is routed to the Gas Bypass Line. At least one Balance Line is provided between the Gas Bypass Line and the Expanded Inclined Liquid Pipe. The Inlet Separator may be an expanded pipe that is sized for gas-liquid separation.

The Expanded Inclined Liquid Pipe is connectable to the liquid feed inlet of a separator device via a control valve VLV-C and the Gas Bypass Line is connectable to the gas outlet line of said separator device. The separator device is advantageously a 3-Phase Separator, though it may also be a 2-Phase Separator as per the specific requirement, and is advantageously connected to the separator via a Restrictor Pipe section containing the control valve VLV-C. The control valve VLV-C under normal operation is wide open. When a liquid slug arrives and liquid level in the Expanded Inclined Liquid Pipe increases, the liquid static head will increase, resulting in higher liquid flow through the Restrictor Pipe into the downstream separator. When liquid level in the separator reaches beyond a pre-set level, the control valve VLC-C will be throttled to further restrict the flow of liquid into the separator, thus causing the liquid level in the Expanded Inclined Liquid Pipe to rise and thereby accommodate the liquid slug or liquid surge volume. This thus reduces or eliminates the slug handling requirements at the downstream separator. The Restrictor Pipe section may contain an Inlet Heater upstream or downstream of the control valve. Advantageously, a Sand Separator may be installed at the terminal end of the Expanded Inclined Liquid Pipe.

According to a variation of the invention, the Gas Bypass Line has an auxiliary line connecting to the Restrictor Pipe section. The Gas Bypass Line and the auxiliary line have respective switching valves VLV-B and VLV-A that are used for controlling the liquid level in the Expanded Inclined Liquid Pipe. The liquid level in the Expanded Inclined Liquid Pipe is controlled by manipulating switching valves VLV-B and VLV-A. When VLV-A is closed and VLV-B is opened, the liquid level in the Expanded Inclined Liquid Pipe will be at the Normal Liquid Level point, which is suitable for normal operating conditions. When heavy slugging is expected, more slug handling volume is created in the Expanded Inclined Liquid Pipe by opening VLV-A and closing VLV-B. This is due to the reduced pressure drop and static head differential between the liquid leg (Expanded Inclined Liquid Pipe, Restrictor Pipe and the downstream separator) and the Gas Bypass Line in latter valve position compared to the former.

The advantages of the Slug Suppression system described herein are:

Reduction in size of the inlet facilities such as the first stage 3-Phase Separator and Inlet Heater.
Enhanced separation efficiency for the First Stage 3-Phase Separator as part of gas has already been separated via the Gas Bypass Line.
Energy saving as the heating and cooling duty of the Inlet Heater and Gas Cooler (prior to the Gas Compression inlet) are reduced.
Pressure fluctuations in the system associated with slug arrivals are significantly attenuated.
Lower pressure drops within the lug Suppression system as the Expanded Inclined Liquid Pipe will be designed to provide the static head required to overcome any pressure drop across equipment installed upstream of the first stage 3-Phase.

Figure 1:
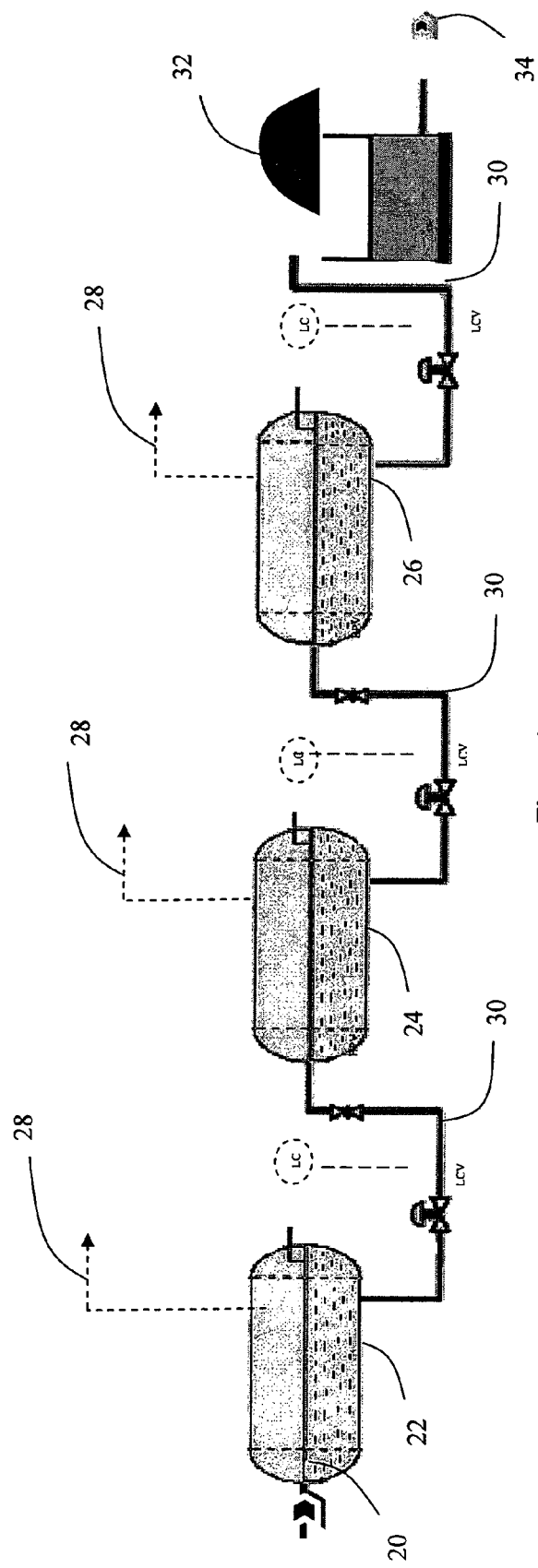
FIG. 1 illustrates a conventional multistage crude oil separation train.
Figure 2:
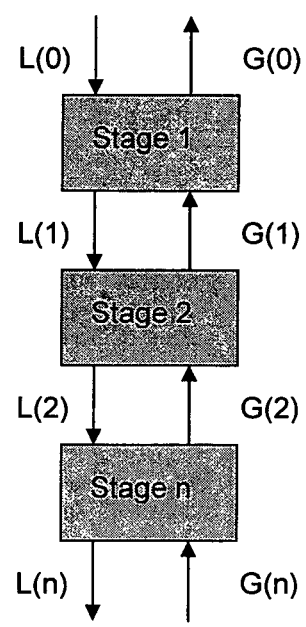
FIG. 2 illustrates the typical flow path and mass transfer in a conventional stabilization column.
Figure 3:
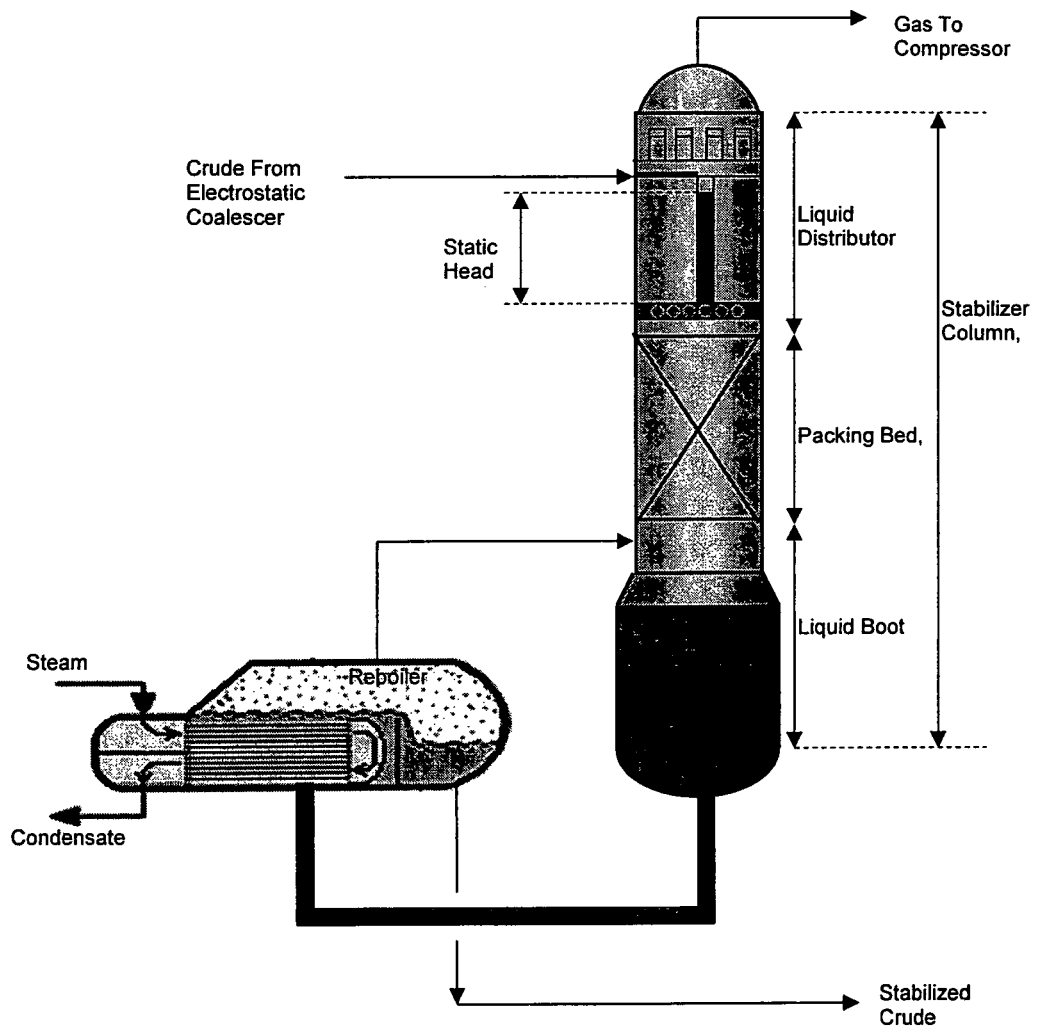
FIG. 3 illustrates the typical configuration of a stabilization column system.

In describing the preferred embodiments of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

MODE(S) FOR CARRYING OUT THE INVENTION

Figure 5:
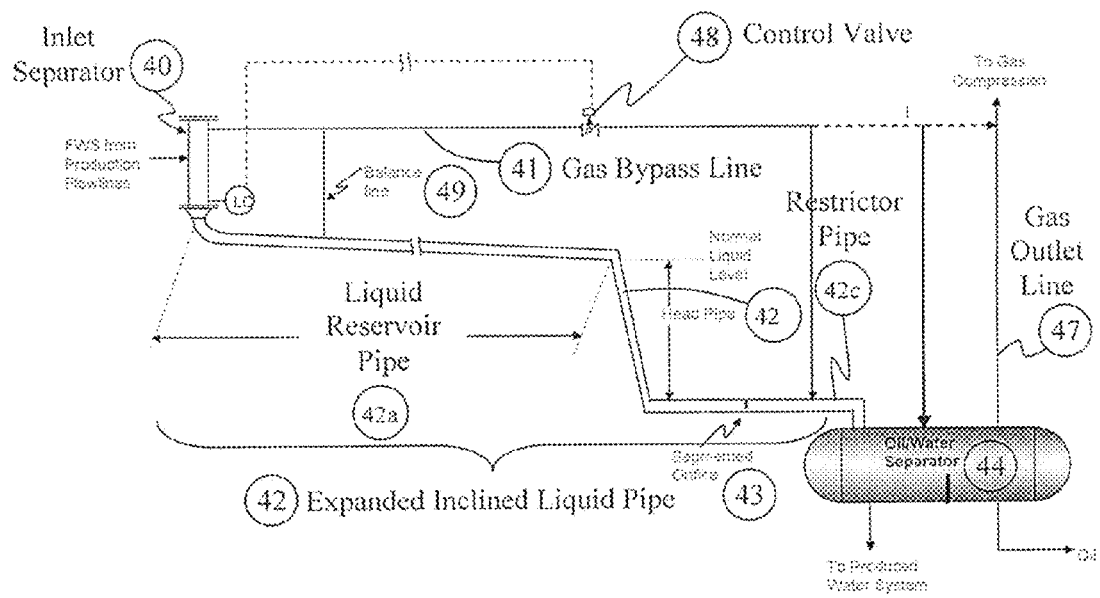
FIG. 5 illustrates a Slug Suppression apparatus with a segmented orifice according to one embodiment of the present invention.

Referring to FIG. 5, there is shown the Slug Suppressor apparatus according to a first preferred embodiment of the present invention which consists of an Inlet Separator 40, capable of gas and liquid separation of fluid (such as FWS fluid), that has a Gas Bypass Line 41 at its upper section and is in operational connection with an Expanded Inclined Liquid Pipe 42 at its lower section. The Inlet Separator 40 may be a conventional separator with or without internals. Alternatively, it may be an expanded pipe piece to enable coarse gas liquid separation.

In operation, fluid such as FWS fluid is first routed to the Inlet Separator 40 for gas and liquid separation after which the liquids, including liquid slugs, are diverted into the Expanded Inclined Liquid Pipe 42 and the gas is routed to the Gas Bypass Line 41.

The Expanded Inclined Liquid Pipe 42 has three sections. The first section, termed Liquid Reservoir Pipe 42a, has a low overall inclination and has a length and diameter that is adequate for accommodating the anticipated slug volume.

The second section of the Expanded Inclined Liquid Pipe 42, termed Head Pipe 42b, is a near vertical or highly inclined pipe over the overall length of the pipe section. The inclination of the Head Pipe 42b versus that of the Liquid Reservoir Pipe 42a is such that the static head contributed by liquid in the Liquid Reservoir Pipe 42a is a small fraction of that contributed by the static head in the Head Pipe 42b. The height of this Head Pipe 42b is predetermined to provide sufficient liquid head to overcome pressure drop of the downstream system whilst providing some surge volume which is approximately 1 minute residence time at design flow.

The third section, termed Restrictor Pipe 42c, has a segmented orifice 43 within and connects directly to a 3-Phase Separator 44. The segmented orifice 43 of this Restrictor Pipe 42c is dimensioned to restrict maximum liquid flow at maximum upstream static head to no more than the maximum liquid handling capacity of the apparatus downstream of the Slug Suppressor apparatus.

The segmented orifice 43, where the orifice opening is at the bottom section, allows fluid to flow through the opening, allowing sand and debris to pass, thus avoiding any accumulation and blockage of solids at the orifice.

According to another mode of carrying out the present invention, where if sand is expected in the incoming FWS fluid, a Sand Separator 45 may be included upstream or downstream of the segmented orifice 43 or without the segmented orifice. The sand removal device may be either a conventional gravity-based separator device using an expanded vertical standpipe sized for gravity settling of sand or a cyclonic sand removal device or any other suitable device. A sand collection boot 46 is provided at the base of the Sand Separator 45 to facilitate sand accumulation. A differential pressure transmitter is provided at the boot to monitor sand level and annunciate at the Distributed Control System (DCS) when sand level is above a preset level in the boot. For removal of the sand from the boot, the isolation valve at the inlet to the boot is closed and that at the base of the boot is opened for collection of sand into drums. Alternatively the sand may be removed using jetting water to a sand removal package. The operation is stopped when the differential pressure transmitter reading normalizes. Alternatively, the operation can be automated with actuated valves.

The system hydraulics is set such that at normal steady state design flow conditions, liquid level in the Expanded Inclined Liquid Pipe 42 will not exceed the height of the Head Pipe 42b. This will make available the full length of the Liquid Reservoir Pipe 42a to accommodate liquid slugs that may arrive.

The configuration of the Slug Suppressor apparatus of the present invention simplifies the controls associated with conventional slug catchers as it eliminates the need for liquid level control valve and thus improves the reliability of the system.

The Inlet Separator 40 component of the present invention allows, as a minimum, coarse gas-liquid separation. The Inlet Separator 40 need not be provided with a liquid hold-up and degassing section as part of the vessel construction. The Expanded Inclined Liquid Pipe 42 instead serves the function of liquid hold-up and degassing. This configuration also minimizes controls and fittings in the system as level control valves are not provided at the liquid outlet line.

Figure 4:
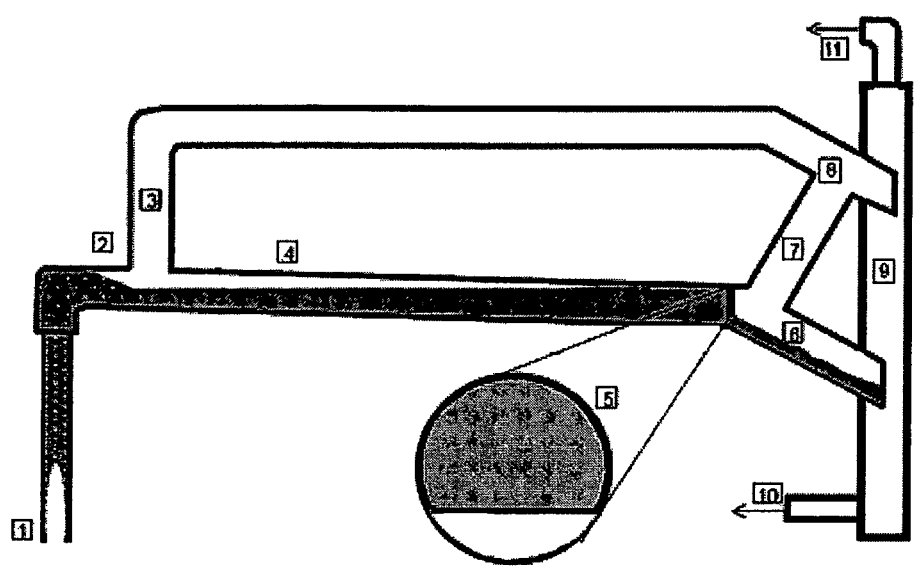
FIG. 4 illustrates the ChevronTexaco slug damper.

The Gas Bypass Line 41 is operationally connected to the Restrictor Pipe 42c downstream of the segmented orifice 43, so that the gas and liquid streams co-mingle to ensure that the pressure of the gas and liquid streams are equalized. This configuration is similar to that of the conventional Chevron-Texaco slug damper indicated in FIG. 4. This ensures that the flow rate of liquid out of the Expanded Inclined Liquid Pipe 42 is dictated by the available static head in the pipe and the system friction loss. Also, this configuration of the Gas Bypass Line 41 being routed to downstream of the segmented orifice 43 ensures that the static head dominates the pressure drop across the segmented orifice 43 as liquid accumulates in the Head Pipe 42b. According to another mode of carrying out the present invention, the Gas Bypass Line 41 is connected directly to the 3-Phase Separator 44 via a separate inlet nozzle if only coarse separation is performed at the Inlet Separator 40. According to yet another mode of carrying out the present invention, particularly applicable where an actual separator is specified as the Separator Device for good separation, the Gas Bypass Line 41 is connected directly to the gas outlet line 47 of the 3-Phase Separator 44. The Gas Bypass Line 41 is dimensioned for full gas flow rate with minimal pressure drop.

A control valve 48 where the pressure drop is minimum when in the open position is provided at the Gas Bypass Line 41. This control valve 48 is normally kept in the wide open position. It is actuated by the upstream Inlet Separator 40 high liquid level control signal to evacuate liquids from the Liquid Reservoir Pipe 42*a*. This ensures that the Liquid Reservoir Pipe 42*a* is emptied as quickly as possible to receive the next slug. According to another mode of carrying out the present invention, there is provided for a high liquid level override signal from the 3-Phase Separator 44 to open the control valve 48 at the Gas Bypass Line 41 to avoid overfilling the separator.

The Gas Bypass Line 41 is located preferably above the maximum expected liquid level of the Inlet Separator 40 to ensure that no liquids from the Inlet Separator 40 enter the Gas Bypass Line 41. Balance Lines are provided between the Gas Bypass Line 41 and Liquid Reservoir Pipe 42*a* to dislodge any trapped vapor at the Liquid Reservoir Pipe. The Balance Lines 49 are nominally approximately 2" (5.1 cm) to 4" (10.2 cm) pipes located about one for every 20 meters of pipe run. As shown in FIG. 5, a single Balance Line 49 may be sufficient.

Alternatively, if the Gas Bypass Line 41 cannot be located above the maximum expected liquid level of the Inlet Separator 40, the Balance Lines 49 will be tied-in to a separate header to be connected to a high point at the inlet separator, above the maximum expected liquid level.

The 3-Phase Separator 44 is a conventional separator with appropriate internals to facilitate gas, oil and water separation and may have calming baffles. As most of the turbulences associated with receipt of 3 phase fluids are suppressed at the upstream Inlet Separator 40 and the Liquid Reservoir Pipe 42*a* the separation efficiency of the 3-Phase Separator 44 is significantly enhanced and gas, oil and water separation at the is very efficient leading to the production of oil with water content that is suitable for direct routing to an Electrostatic Coalescer for final polishing to reduce Basic Sediments and Water (BS&W) content to the required level. In addition, pressure fluctuations in the system associated with slug arrival are significantly dampened.

The size of the 3-Phase Separator 44 is also significantly reduced compared to a first stage separator of a conventional multistage separation system due to the following:

If the Gas Bypass Line 41 is connected directly to the gas outlet line 47 of the 3-Phase Separator 44, the gas handling requirements are significantly reduced as bulk gas separation is performed at the upstream Inlet Separator 40.

The slug handling requirements are eliminated as the upstream Liquid Reservoir Pipe 42*a* captures the arriving slugs.

Figure 6:
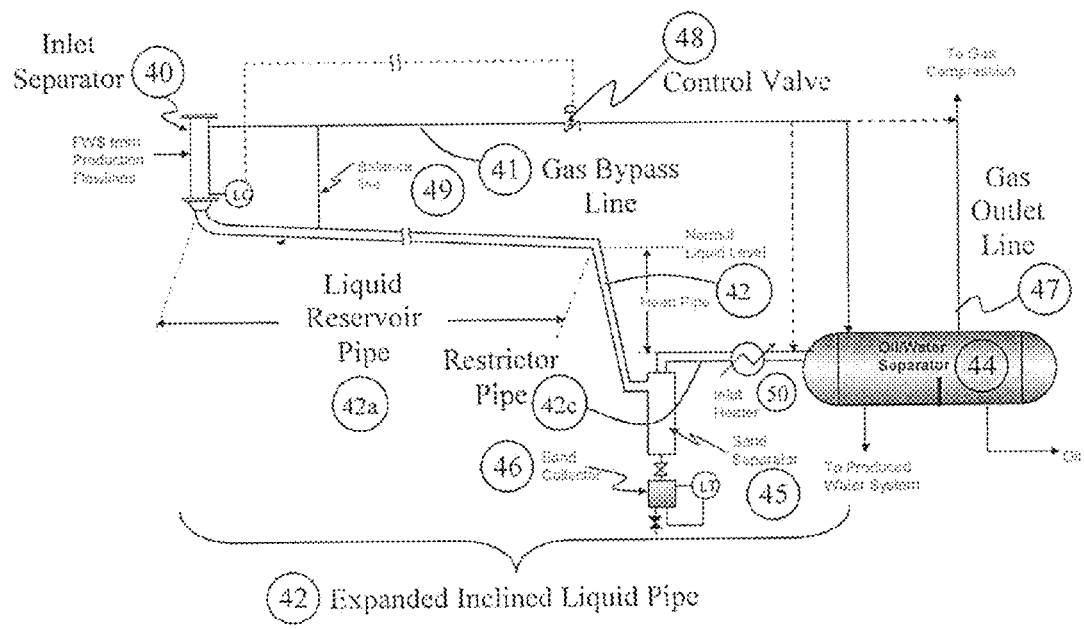
FIG. 6 illustrates a Slug Suppression apparatus with sand removal means and heater according to another embodiment of the present invention.

Referring to FIG. 6, there is shown the Slug Suppressor apparatus according to a second preferred embodiment of the present invention. This embodiment has a configuration that is similar to that of the first preferred embodiment as shown in FIG. 5 except that an Inlet Heater 50 is installed downstream of the Head Pipe 42*b* instead of a segmented orifice 43. In this embodiment, the liquid static head in the Head Pipe 42*b* needs to be adequate to overcome the pressure drop across the Inlet Heater 50. The segmented orifice 43 is not needed as the flow rate will be limited by the available static head to overcome the pressure drop across the Inlet Heater 50. This arrangement has the benefit of heating only the liquid stream and avoids heating of the gas stream which is bypassed via the Gas Bypass Line 41 of the Inlet Separator 40. The system effectively utilizes the static head available in the Head Pipe 42*b* to control flow through the Inlet Heater 50 and thus eliminates permanent pressure drop. This results in reduced downstream compression power requirements.

In this embodiment, the Gas Bypass Line 41 is connected to the Restrictor Pipe 42*c* downstream of the Inlet Heater 50, to ensure that the liquid static head in the Head Pipe 42*b* dominates the flow rate through the downstream system. According to other configurations, the Gas Bypass Line 41 is connected directly to the 3-Phase Separator 44 or directly to the gas outlet line 47 of the 3-Phase Separator 44.

According to another mode of carrying out this embodiment of the present invention, where, if sand is expected, a Sand Separator 45 may be included upstream of the Inlet Heater 50.

Figure 7:
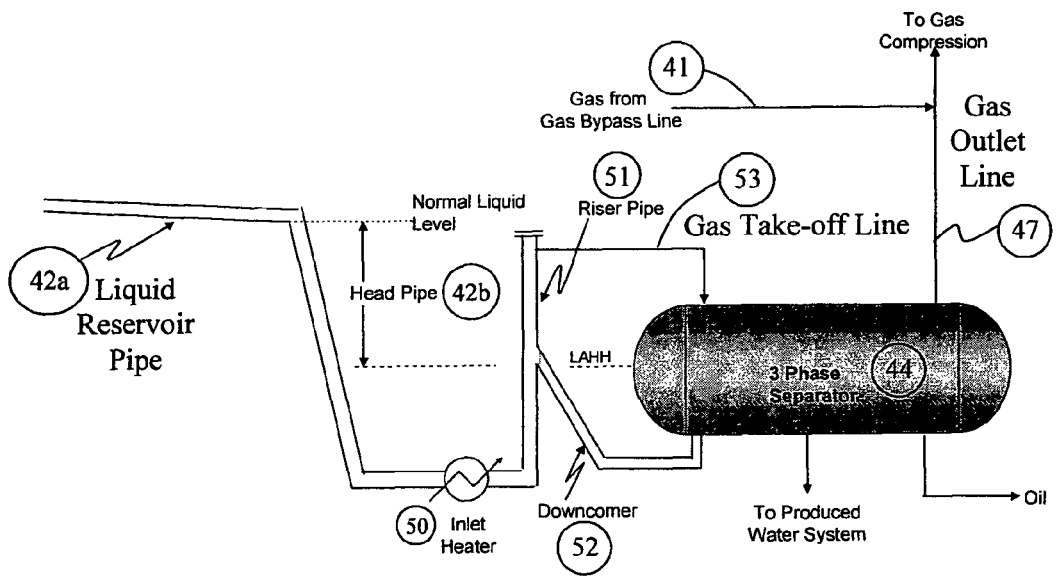
FIG. 7 illustrates a Slug Suppression apparatus where the heater is at low elevation and connects to a Riser Pipe is untilised according to another embodiment of the present invention.

Referring to FIG. 7, there is shown the Slug Suppressor apparatus according to a third preferred embodiment of the present invention. This embodiment has a configuration that is similar to that of the second preferred embodiment as shown in FIG. 6 except that the Inlet Heater 50 is installed at a lower elevation than the liquid level in the 3-Phase Separator 44. A Riser Pipe 51 and a liquid Downcorner Pipe 52 are provided downstream of the Inlet Heater 50. The liquid Downcorner Pipe 52 is taken-off at the Riser Pipe 51 at an elevation corresponding to maximum liquid level in the 3-Phase Separator 44 and is connected to the separator at the base. This line functions as the liquid inlet to the separator. This configuration minimizes the amount of liquid static head required in the Head Pipe 42*b* and thus minimizes its height.

At the top of the Riser Pipe 51, a gas take-off line 53 connects the Riser Pipe 51 to the gas inlet nozzle of the 3-Phase Separator 44. This ensures that only liquid overflows into the Downcorner Pipe 52 and into the base of the separator. Flash gas generated at the Inlet Heater will separate in the Riser Pipe 51 and is routed to the gas inlet nozzle of the separator 44 via the gas take-off line 53.

With this configuration, liquid level is always maintained in the Head Pipe 42*b* and thus prevents gas blowby from the Inlet Separator 40.

Sand traps are provided at low points to trap sand if present. If significant amount of sand is expected, a Sand Separator 45 may also be included upstream of the Inlet Heater 50.

Also, in this third preferred embodiment of the invention, the Inlet Heater 50 may be a segmented orifice 43 instead.

Figure 8:
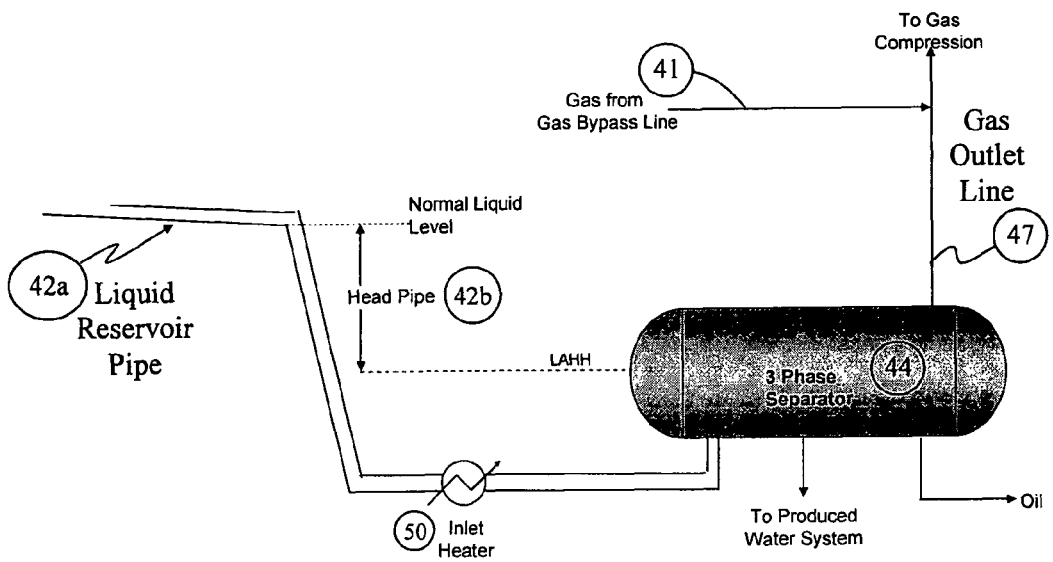
FIG. 8 illustrates a Slug Suppression apparatus where the heater is at low elevation and and connects to an inlet nozzle at the bottom of the 3-Phase Separator according to another embodiment of the present invention.

Referring to FIG. 8, there is shown the Slug Suppressor apparatus according to a fourth preferred embodiment of the present invention where the Inlet Heater 50 is installed at an elevation lower than the 3-Phase Separator 44 and with the feed inlet nozzle at the separator being at the bottom of the vessel. This configuration likewise prevents gas blowby from the upstream system to the 3-Phase Separator 44 as a liquid seal is present at the Head Pipe 42*b*. As feed from the Inlet Heater 50 to the 3-Phase Separator 44 is predominantly in the liquid phase with minimal amounts of flash gas, bottom inlet to the separator is suitable. The small amounts of flash gas generated at the Inlet Heater 50 also would function as floatation gas to enhance oil-water separation. According to another mode of carrying out the present invention, an inlet device is provided at the separator inlet to enhance separation. According to yet another mode of carrying out the present invention, where suppressing of foam formation is necessary means for antifoam injection are provided or the separator itself may be fitted with the necessary means for suppressing foam formation.

Sand traps are provided at low points to trap sand if present. If sand is expected, a sand removal system may also be included upstream of the Inlet Heater 50.

Figure 9:
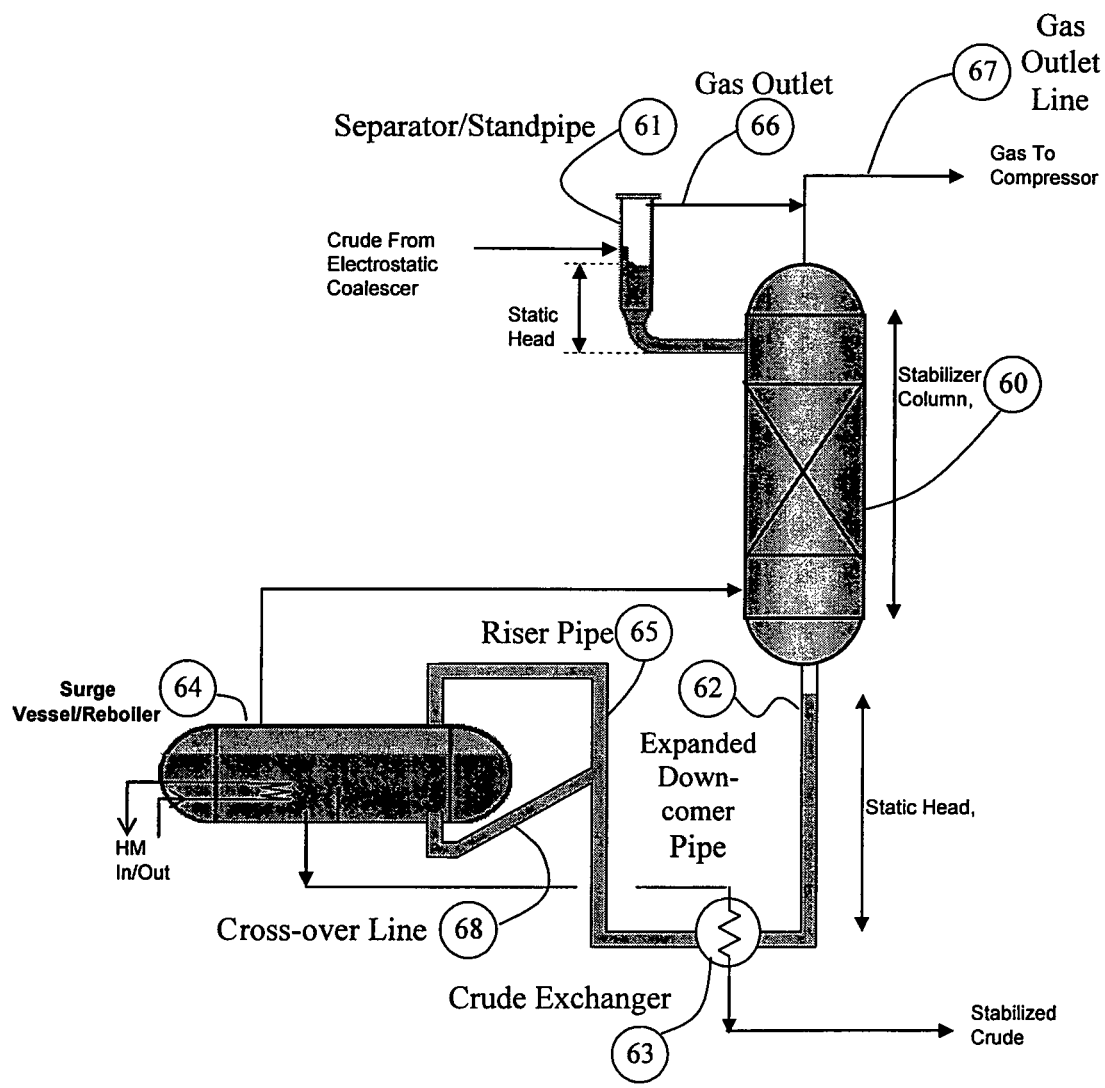
FIG. 9 illustrates the crude oil stabilization assembly of the present invention.

Referring now to FIG. 9, there is shown a crude oil stabilization assembly according to the present invention.

The assembly comprises a stabilizer column 60, a separator or an expanded standpipe 61 for vapor-liquid disengagement provided upstream of the stabilizer column 60, an expanded down-corner pipe 62 at the base of the column 60, a crude exchanger 63 in operational connection with the down-corner pipe, and a Surge/Reboiler Vessel 64 in operational connection with the crude exchanger 63 via a riser pipe 65.

In operation, crude from the electrostatic coalescer (desalter) is cooled (depending on specific system requirements) prior to being routed to the top of the column 60. Depending on the solids content of the crude to the stabilizer column and the type of packing used in the column, a filter for solids removal may be required upstream of the column.

Un-stabilized crude which may have some flash gas is first sent to a separator or standpipe 61. Liquid from the separator or stand pipe 61 is routed to the liquid distributor of the stabilizer column 60. The gas outlet 66 from the separator or standpipe 61 is routed to the gas outlet line 67 of the stabilizer column 60. This ensures that liquid flow to the stabilizer column 60 is dependent on the static head of the liquid column in the separator or standpipe 61. The turndown capability of the column 60 is dictated by the height of the standpipe 61 relative to the liquid distributor in the column. This enables the column 60 to handle high turndown ratio without the need to increase the height of the liquid distributor down-corner pipe within the column. This configuration essentially translates to having the liquid distributor down-corner pipe external to the stabilizer column, thus enabling the column height to be reduced whilst allowing for high turndown in liquid flow. The stabilizer column itself may be a packed, trayed or with any other internals to facilitate mass and heat transfer.

Liquid from the stabilizer column bottom is routed via an expanded down-corner pipe 62 at the base of the column to a crude exchanger 63. The crude exchanger 63 functions as a thermosyphon exchanger. Liquid with flashed vapor from the crude exchanger 63 is routed to the Surge/Reboiler Vessel 64 via a riser pipe 65 for further heating of the crude to the desired temperature to stabilize the crude and for vapor-liquid separation. Gas from the Surge/Reboiler Vessel 64 is routed to the base of the stabilizer column 60 while stabilized liquid from the vessel is routed to the crude exchanger 63 for heat recovery.

The stabilizer column 60 is not provided with a liquid collection boot but instead a separate surge vessel 64 with reboiler coils is provided as mentioned above. This further reduces the height of the column 60.

The stabilizer column 60 base is located at an elevation higher than the maximum liquid level in the Surge/Reboiler Vessel 64. This ensures that normal operation liquid level is always maintained in the down-corner standpipe 62 at the base of the column 60.

Liquid levels in the down-corner standpipe 62 of the stabilizer column 60 and the Surge/Reboiler Vessel 64 are maintained by hydraulic balance between the hydrostatic head in the down-corner pipe 62 of the column 60, the hydrostatic head of the fluid in the riser pipe 65 downstream of the crude exchanger 63 and the system frictional losses (at the crude exchanger and interconnecting pipes).

To avoid un-stable operation during turndown flow conditions (that is prevalent with systems configured with thermosyphon exchangers), a cross-over line 68 from the riser pipe 65 to the bottom of the Surge/Reboiler Vessel 64 is provided to ensure that at turndown flow rates, high liquid levels do not build-up in the riser pipe 65. This also minimizes the static head in the riser pipe 65 and thus minimizes liquid level in the column down-corner pipe 62.

The size of the down-corner pipe 62 is determined to degas the crude, minimize pressure drop and to provide some buffer volume for liquid holdup. As a minimum, the down-corner pipe 62 is to be sized to ensure that vapor locks do not occur.

Balance Lines are provided between the standpipe and the stabilizer column to dislodge any trapped vapor at the down-corner pipe.

The installation of a crude exchanger 63 to preheat crude from the stabilizer column 60 with hot stabilized crude from the Surge/Reboiler Vessel 64 allows for heat recovery from hot stabilized crude from the Surge/Reboiler Vessel. This significantly reduces the net heat duty required at the reboiler 64 and thus improves the energy efficiency of the facility, apart from reducing the capacity and complexity of the heating medium supply system.

The configuration of the stabilizer column 60 and the Surge/Reboiler Vessel 64 is predetermined such that the column can be isolated from the Surge/Reboiler Vessel 64 in the event that the stabilizer column 60 requires maintenance. Under this scenario, the Surge/Reboiler Vessel 64 will be operated as a separator and the system operated as a 2-stage separation system (or a 3-stage separation system depending on whether a 2nd stage separator is provided downstream of the 3-stage separator). As such, the availability of the system is not dependent on the availability of the stabilizer column 60, as with the column off-lined, production will still continue to be operated as a multi-stage separation train.

Figure 10:
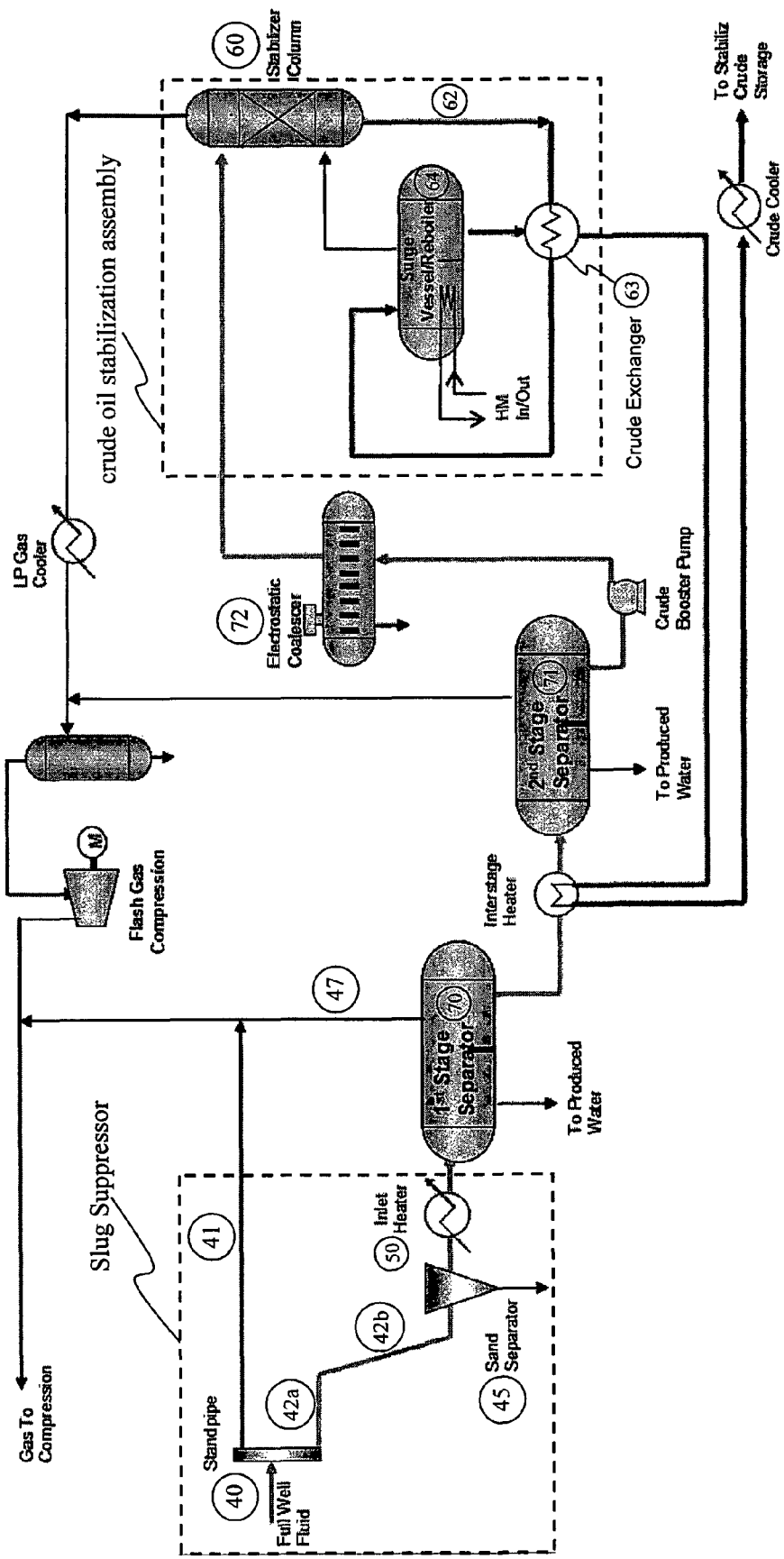
FIG. 10 illustrates an integrated system featuring the Slug Suppression apparatus and the crude oil stabilization assembly of the present invention.

The present invention also extends to a crude oil processing system that incorporates the Slug Suppressor apparatus described herein and the crude oil stabilization assembly of the present invention as an integrated system. This is illustrated by FIG. 10 where the oil from a first stage separator 70, which receives the oil from a Slug Suppressor apparatus according to the present invention as described herein, is routed to a second stage separator 71, and subsequent to a crude oil stabilization assembly as per the invention described herein. It is also possible to route the oil from the first stage separator directly to the crude oil stabilization assembly via an Electrostatic Coalescer 72 or Desalter.

A case study to compare the performance of the apparatus of the present invention against a conventional 3-stage separation system was carried out. For this study, FWS Crude arrives at the processing facility at 9 bara and 55° C. The crude with produced water is initially heated to 65° C. for emulsion breaking and is then heated to the required temperature for stabilization. For the 3-Stage Separation system, an Inlet Heater to heat the FWS fluid is provided followed by a 3-stage separation system for crude stabilization, similar to that shown in FIG. 1.

For the Novel Crude Stabilization system, the slug suppression device with the crude stabilization system as depicted in FIG. 10 is utilized.

For both cases, flash gas from the separators/stabilization column is re-compressed and routed to the HP compressors where gas is compressed to 130 barg for gaslift and export.

The table on the following page summarizes the results of the study mentioned hereinbefore.

| Description | Unit | 3-Stage Separation System | Novel Crude Stabilization System | Differential Improvement |
|---|---|---|---|---|
| Oil Production Rate | BPD | 45,100 | 46,110 | 1010 |
| TVP (37.8° C.) | psia | 12 | 12 | |
| RVP (37.8° C.) | psia | 8.6 | 9.8 | |
| Density | °API | 38.6 | 39.6 | |
| Viscosity @ 37.8° C. | cP | 2.43 | 2.25 | |
| Export Gas Rate | MMscfd | 29.0 | 27.9 | −1.1 |
| Gas Lift Rate | MMscfd | 60 | 60 | |
| GHV | Btu/scf | 1614 | 1530 | |
| HC Dewpoint (60 barg) | ° C. | 56.5 | 41.0 | |
| LP Compressor | kW | 199.2 | 213.4 | |
| MP Compressor | kW | 162.5 | Na | |
| HP1 Compressor | kW | 10070 | 7696 | |
| HP2 Compressor | kW | 4420 | 4468 | |
| Total | kW | 14758 | 12377 | −2,474 |
| LP Comp Aftercooler | kW | 713.2 | Na | |
| MP Comp Aftercooler | kW | 577.9 | 1904 | |
| HP1 Comp Aftercooler | kW | 20870 | 9631 | |
| HP2 Comp Aftercooler | kW | 8606 | 8406 | |
| Crude Cooler | kW | 907 | 2983 | |
| Total | kW | 31674 | 22924 | −8,750 |
| Inlet Heater | kW | 12660 | 7858 | |
| Interstg Heater | kW | 849.7 | Na | |
| Reboiler | kW | Na | 3593 | |
| Total | kW | 13509.7 | 11451 | −2059 |

The above tabulation indicates that the crude stabilization system proposed in the present invention has significant benefits over the conventional 3-stage separation system. These include:

Increased crude recovery of approximately 1,000 bpd at design rates. This is equivalent to an increment in revenue of approximately US $17 million per year assuming crude price of US $50 per barrel and a process availability of 95%.

As more intermediate hydrocarbons (C4+ components) are loaded into the crude, within its TVP/RVP specifications, the quality of the bulk stabilized crude is also improved. This is reflected as improved crude API Gravity and viscosity.

The gas export rate however marginally shrinks although the quality of export gas is improved i.e. gas dew-point is lower and gas GHV is lower. Note: The process facilitates the installation of an enhanced dew-point control system, e.g. JT valve, etc, without creating excessive LPG recycles in the system.

The compression power of the system is reduced by approximately 2.5 MW due to the following reasons:
  LPG (C4+) recycles are minimized as much of these components are absorbed as stabilized crude
  The Slug Suppression device minimizes the pressure drop associated with the inlet heater
  The Slug Suppression device avoids heating the gas phase and thus delivers cool and lean gas to the gas compression train.

The cooling duty of the system is also reduced by approximately 8.7 MW and is predominantly due to the reduced compression requirements and associated reduction in cooling duty of the aftercoolers and as gas is not heated with crude and produced water at the Slug Suppression system.

In spite of the fact that a crude stabilization column is utilized, which typically requires high reboiler duty, the proposed configuration of the system requires lower heating duty than that of a 3 stage separation system. The heating duty being reduced by approximately 2 MW. This is attributed to the avoidance of heating the gas stream at the Suppression system, and due to the novel heat recovery concept utilized at the Crude Stabilization system:

Apart from the above benefits, it is envisaged that the proposed invention will result in space and weight savings due to the reduction in size of the 1st Stage (3-Phase) Separator due to the elimination of slug handling requirements and significantly reduced gas loading. The Inlet Heater size is also reduced as it does not handle the total gas load. Apart from this, the compression system, cooling and heating medium sizes and weights will also be significantly reduced. It addition, as the slugs and the associated pressure surges will be suppressed by the Slug Suppression system, a more stable and reliable system is envisaged compared to the conventional 3-stage separation system.

Figure 11:
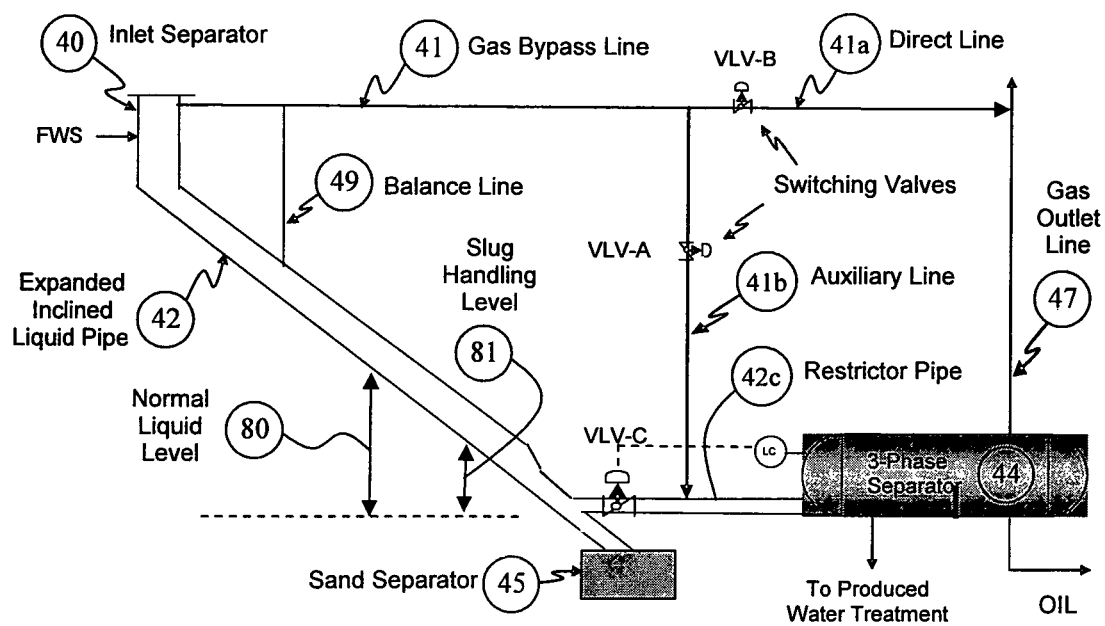
FIG. 11 illustrates a Slug Suppression apparatus according to an additional preferred embodiment of the present invention.

According to an additional preferred embodiment of the Slug Suppressor apparatus of present invention, which is illustrated by FIG. 11, the apparatus consists of an Inlet Separator 40, for gas-liquid separation of production fluid such as Full Well Stream (FWS) fluid, which is connected at its bottom section to an Expanded Inclined Liquid Pipe 42 and at its upper section to a Gas Bypass Line 41. The separated liquid from the Inlet Separator 40 is routed to the Expanded Inclined Liquid Pipe 42 while the separated gas is routed to the Gas Bypass Line 41.

The Expanded Inclined Liquid Pipe 42 is a large size pipe that has a predetermined cross section that is sufficiently sized to ensure proper gas-liquid separation and capability to handle the largest possible slug or liquid surge volume. The Expanded Inclined Liquid Pipe 42 has an inclination such that it has sufficient liquid column to overcome the downstream pressure drop.

One or a plurality of Balance Lines 49 are provided between the Gas Bypass Line 41 and Expanded Inclined Liquid Pipe 42 to dislodge any trapped vapor at the Expanded Inclined Liquid Pipe 42. The Balance Lines 49 are sized to dislodge the gas from the liquid in the Expanded Inclined Liquid Pipe 42 and the size, location and number is ideally optimized using Computational Fluid Dynamics. Typically the size can range from approximately 2" (5.1 cm) to 20" (50.1 cm) pipes located about one for every 10 meters of pipe run. The actual number of Balance Lines 49 required is inversely proportional to the size of the Expanded Inclined Liquid Pipe 42, with a larger Expanded Inclined Liquid Pipe requiring lesser or even a single Balance Line 49. Also, with reduced number of Balance Lines 49, the larger will be the size of the Balance Lines.

A Sand Separator is installed at the terminal end of the Expanded Inclined Liquid Pipe 42 where additional valves will be added to periodically remove the sand. The Sand Separator 42 functions on the gravitational settlement of the solids in the fluid.

The lower end of Expanded Inclined Liquid Pipe continues into a Restrictor Pipe 42c section that contains a control valve VLV-C and which is connected to the liquid feed inlet of a 3-Phase Separator 44. According to one variation of the embodiment of the invention, the Restrictor Pipe 42c has an Inlet Heater.

The Gas Bypass Line 41 via which the separated gas is routed from the Inlet Separator 40 is connected via a direct line 41a to the gas outlet line 47 of said 3-Phase Separator 44 and via an auxiliary line 41b to the Restrictor Pipe 42c upstream of the control valve VLV-C. A set of Switching Valves, respectively VLV-B and VLV-A, are respectively provided on the direct line 41a and the auxiliary line 41b and are used to manipulate the liquid level in the Expanded Inclined Liquid Pipe 42 by routing the gas from the Inlet Separator 40 upstream or downstream of the separator 44. When the gas is routed to upstream of the Inlet Separator 40, the slug handling volume in the Expanded Inclined Liquid Pipe 42 is increase. When the gas is is routed downstream of the Inlet Separator 40, the gas pressure drop and the differential static head of the liquid and gas system is reduced and this results in some of the slug handling volume of the Expanded Inclined Liquid Pipe 42 being correspondingly reduced due to the lower normal liquid level in the Expanded Inclined Liquid Pipe 42.

In operation, during normal operating conditions VLV-A is closed and VLV-B is opened causing the liquid level in the Expanded Inclined Liquid Pipe 42 to be at the Normal Liquid Level 80 point and the pressure drop in the Gas Bypass Line 41 to be minimal. Though this results in the slug handling volume of the Expanded Inclined Liquid Pipe 42 being reduced, the volume is more than sufficient to cater for normal transient slugging. This avoids the need for the downstream 3-Phase Separator 44 to handle the full gas and liquid streams during normal operation and minimizes the operating temperature of the gas stream as it is not co-mingled with the hot liquid stream that is heated at the Inlet Heater 40 at the Restrictor Pipe 42c.

When a large liquid surge is expected, such as during a pigging operation, VLV-B will be closed and VLV-A opened, causing the liquid level in the Expanded Inclined Liquid Pipe 42 to be reduced to the Slug Handling Level 81 point due to the reduced differential static head and pressure drop between the liquid and gas legs of the system. This increases the slug handling volume of the Expanded Inclined Liquid Pipe 42 to cater to the anticipated liquid volume surge. The liquid surge is held in the increased volume of the Expanded Inclined Liquid Pipe 42 based on level control in the 3-Phase Separator 44 by manipulating control valve VLV-C.

Figure 12:
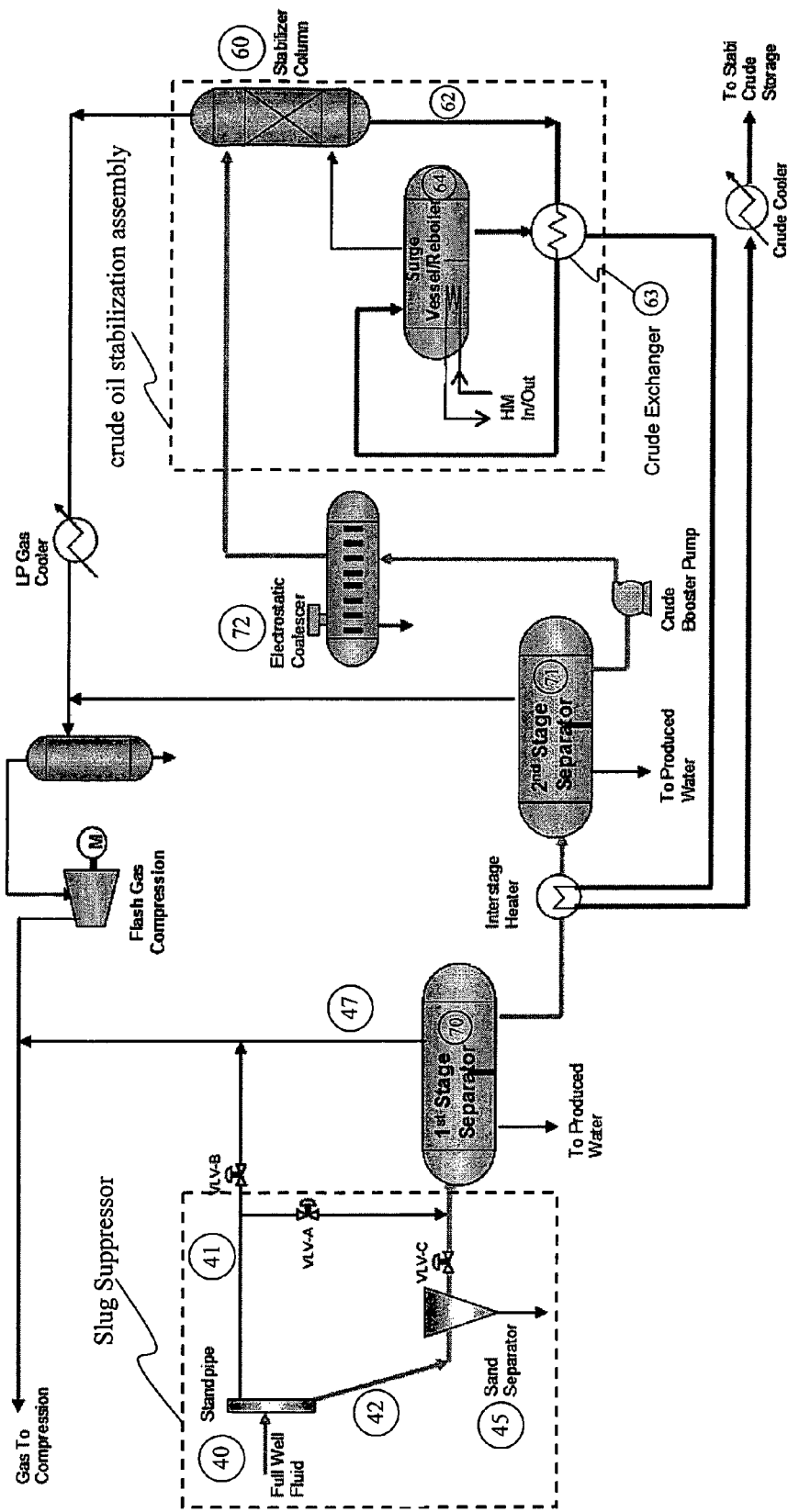
FIG. 12 illustrates an integrated system featuring the Slug Suppression apparatus of the additional preferred embodiment of the invention described herein and the crude oil stabilization assembly.

The present invention also extends to a crude oil processing system that incorporates the Slug Suppressor apparatus described herein and the crude oil stabilization assembly shown in FIG. 10 as an integrated system. This is illustrated by FIG. 12 where the oil from a first stage separator 70, which receives the oil from a Slug Suppressor apparatus according to the present invention as described herein, is routed to a second stage separator 71, and subsequent to a crude oil stabilization assembly as per the invention described herein. It is also possible to route the oil from the first stage separator directly to the crude oil stabilization assembly via an Electrostatic Coalescer 72 or Desalter.

The embodiments of the invention described herein are only meant to facilitate understanding of the invention and should not be construed as limiting the invention to those embodiments only. Those skilled in the art will appreciate that the embodiments of the invention described herein are susceptible to variations and modifications other than those specifically described. It is to be understood that the invention includes all such variations and modifications which fall within the scope of the inventive concept thereof.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A slug suppressor apparatus, said apparatus comprising:
an inlet separator (40) for gas-liquid separation for fluids and an expanded inclined liquid pipe (42) of sufficient volume for receiving separated fluid from said inlet separator (40),
said inlet separator (40) having an inlet for receiving full well stream fluid and a separated gas outlet in its upper section and a separated liquid outlet in its lower section,
said separated gas outlet operationally connected to a gas bypass line (41) and said separated liquid outlet operationally connected to said expanded inclined liquid pipe (42),
said expanded inclined liquid pipe (42) further having means for holding liquid slugs;
said expanded inclined liquid pipe (42) has a first liquid reservoir pipe (42a) section of low overall inclination, a second head pipe (42b) section of high inclination to provide sufficient liquid head to overcome pressure drop of a downstream system, and a third restrictor pipe (42c) section incorporating a device that restricts flow,
said restrictor pipe (42c) section is connected to a 3-Phase separator (44),
wherein an inlet heater (50) is installed downstream of said head pipe (42b) section and disposed at said restrictor pipe (42c) section.

2. The slug suppressor apparatus according to claim 1, wherein at least one balance line (49) is provided between said gas bypass line (41) and said liquid reservoir pipe (42a) to dislodge any trapped vapor at said liquid reservoir pipe.

3. The slug suppressor apparatus according to claim 1, wherein said restrictor pipe (42c) section has a sand separator (45) upstream of said inlet heater (50).

4. The slug suppressor apparatus according to claim 3, wherein said gas bypass line (41) is connected to said restrictor pipe (42c) downstream of said inlet heater (50).

5. The slug suppressor apparatus according to claim 1, wherein said inlet heater (50) is disposed at an elevation below the liquid level in said 3-Phase Separator (44) and said restrictor pipe (42c) section downstream of said inlet heater (50) being a riser pipe (51), said riser pipe (51) having a gas take-off line (53) at the top thereof and a liquid downcomer pipe (52) taken off therefrom at an elevation corresponding to maximum liquid level in said 3-Phase Separator (44), said gas take-off line (53) connecting to a gas inlet nozzle of said 3-Phase Separator (44) and said liquid downcomer pipe (52) connecting to a base of said 3-Phase Separator (44).

6. The slug suppressor apparatus according to claim 5, wherein said gas bypass line (41) is connected directly to the gas outlet (47) of said 3-Phase separator (44).

7. The slug suppressor apparatus according to claim 1, wherein said inlet heater (50) is disposed at an elevation below a liquid level in said 3-Phase separator (44) with the feed inlet nozzle of said 3-Phase Separator (44) being at the bottom of said 3-Phase separator.

8. The slug suppressor apparatus according to claim 1, wherein said gas bypass line (41) is connected directly to said 3-Phase separator (44).

9. The slug suppressor apparatus according to claim 1, wherein a control valve (48) is provided at said gas bypass line (41).

10. The slug suppressor apparatus according to claim 9, wherein said control valve (48) is responsive to a high liquid level control signal from said 3-Phase Separator (44).

11. The slug suppressor apparatus according to claim 1, wherein said device that restricts flow in said restrictor pipe (42c) section is at least one segmented orifice (43) that is dimensioned to restrict maximum liquid flow at maximum upstream static head to no more than maximum liquid handling capacity of the downstream system.

12. The slug suppressor apparatus according to claim 11, wherein there is a sand separator (45) upstream or downstream of said at least one segmented orifice (43).

13. The slug suppressor apparatus according to claim 11, wherein said gas bypass line (41) is connected directly to said restrictor pipe (42c) downstream of said at least one segmented orifice (43).

14. The slug suppressor apparatus according to claim 1, wherein said gas bypass line (41) is located above a maximum expected liquid level of said inlet separator (40) to ensure that no liquids from said inlet separator enter said gas bypass line.

15. The slug suppressor apparatus according to claim 1 wherein routing means are provided to route oil to a first stage 3-Phase Separator (70) then to a second stage separator (71) and subsequently to a crude oil stabilization assembly.

16. A process for stabilizing crude oil, said process comprising the steps of:
(a) introducing un-stabilized crude into the top of a separator column (61) for oil-gas separation;
(b) routing separated oil from said separator column (61) to a liquid distributor and separated gas to a gas outlet line (67) of a stabilizer column (60);
(c) routing the oil from stabilizer column (60) bottom to a crude exchanger (63) via an expanded down-corner pipe (62) at the base of said stabilizer column (60);
(d) routing the oil with flashed vapor from said crude exchanger (63) to a surge/reboiler vessel (64) via a riser pipe (65) for further heating of the oil to a desired temperature to achieve stabilization of the oil and vapor-liquid separation; and
(e) routing the gas from said surge/reboiler vessel (64) to the base of said stabilizer column (60) and the stabilized oil to the crude exchanger (63) for heat recovery.

17. A slug suppressor apparatus, said apparatus comprising:
an inlet separator (40) for gas-liquid separation of fluids, said inlet separator (40) connected at its bottom section to a diagonally disposed expanded inclined liquid pipe (42) and at its upper end to a gas bypass line (41),
said expanded inclined liquid pipe (42) having sufficient size to handle large slugs or liquid surge volume and an inclination that provides for sufficient liquid column to overcome the downstream pressure drop,
said expanded inclined liquid pipe (42) being connectable to a separator device (44) via a control valve (VLV-C) and said gas bypass line (41) being connectable to a gas outlet line (47) of said separator device (44),
at least one balance line is provided between said gas bypass line (41) and said expanded inclined liquid pipe (42);
said expanded inclined pipe (42) is connectable to said 3-Phase separator or 2-Phase separator via a restrictor pipe (42c) section, said restrictor pipe section containing said control valve (VLV-C);
wherein said restrictor pipe (42c) section further contains an inlet heater upstream or downstream of said control valve (VLV-C.

18. The slug suppressor apparatus according to claim 17, wherein said separator device (44) is a 3-Phase separator or 2-Phase separator.

19. The slug suppressor apparatus according to claim 17, wherein said gas bypass line has a direct line (41a) section connecting to said gas outlet line (47) of said 3-Phase separator and an auxiliary line (41b) connecting to said restrictor pipe (42c) section, said direct line (41a) and said auxiliary line (41b) having switching valves respectively (VLV-B) and (VLV-A) for controlling the normal liquid level in said expanded inclined liquid pipe (42).

20. The slug suppressor apparatus according to claim 17, wherein a sand separator (45) is installed at a terminal end of said expanded inclined liquid pipe (42).

21. The slug suppressor apparatus according to claim 17, wherein said inlet separator (40) is an expanded pipe sized for gas-liquid separation.

22. The slug suppressor apparatus according to claim 17 wherein routing means are provided to route oil to a first stage 3-Phase separator (70) then to a second stage separator (71), and subsequently to a crude oil stabilization assembly.

* * * * *